(12) United States Patent
Kim

(10) Patent No.: US 6,619,353 B1
(45) Date of Patent: Sep. 16, 2003

(54) CHAIN FOR TIRE

(76) Inventor: Jong Gil Kim, Na-101 Daehwa-housing, 474-5 Jayang-3 dong Kwangjin-gu, Seoul (KR)

(*) Notice: Subject to any disclaimer, the term of this patent is extended or adjusted under 35 U.S.C. 154(b) by 0 days.

(21) Appl. No.: 10/048,431

(22) PCT Filed: Aug. 19, 2000

(86) PCT No.: PCT/KR00/00927

§ 371 (c)(1),
(2), (4) Date: Jan. 30, 2002

(87) PCT Pub. No.: WO01/14155

PCT Pub. Date: Mar. 1, 2001

(30) Foreign Application Priority Data

Aug. 20, 1999 (KR) .......................................... P 99-34643
Feb. 29, 2000 (KR) ....................................... P 2000-10236

(51) Int. Cl.$^7$ ............................................... B60C 27/00
(52) U.S. Cl. ..................... 152/225 R; 152/218; 152/231
(58) Field of Search ................................. 152/217, 218, 152/213, 219, 221, 222, 223, 231, 216, 208, 241, 225 R; 29/299, 517; 24/73 CE, 73 AC, 70 TT

(56) References Cited

U.S. PATENT DOCUMENTS

| | | | | |
|---|---|---|---|---|
| 3,893,501 A | * | 7/1975 | Brummer et al. | ........ 152/213 R |
| 4,237,951 A | * | 12/1980 | Dirks | .......................... 152/242 |
| 5,735,980 A | * | 4/1998 | Robeson | ..................... 152/216 |
| 5,785,783 A | * | 7/1998 | Thioliere | .................... 152/216 |

FOREIGN PATENT DOCUMENTS

| | | |
|---|---|---|
| JP | 61-76707 | 5/1986 |
| JP | 62-191506 | 12/1987 |
| KR | 95-13708 | 6/1995 |

OTHER PUBLICATIONS

Ichigawa Pres Co. Ltd, May 23, 1986, Japanese Patent Office, JP–61–767–7 A, entire document.*

Ikeda Budsan Co. Ltd, Dec. 5, 1987, Japenese Patent Office, JP–191506 A, entire document.*

International Serach Report for PCT/KR00/00927, KR, Dec. 27, 2000.

* cited by examiner

Primary Examiner—S. Joseph Morano
Assistant Examiner—Frantz F. Jules
(74) Attorney, Agent, or Firm—Harness, Dickey & Pierce, P.L.C.

(57) ABSTRACT

An apparatus for preventing a slipping of a tire is disclosed. The apparatus for preventing a slipping of a tire includes a wire having separable coupling units connected at both ends of the wire at an inner side of a tire for thereby forming a circle shape having a diameter smaller than an outer diameter of the tire, a plurality of friction members each having one end connected to the wire at a certain regular distance and extended from the wire across a grounding surface of the tire to an outer side of the tire and arranged along a grounding surface of the tire at a certain regular distance, a straight line movement conversion mechanism inserted in an outer center portion of the tire for converting a moment generated in a handle in a radial direction from the center into a tension force in the center direction and applying the tension force to the other ends of the friction members, a reverse rotation prevention unit for preventing a reverse rotation of the straight line movement conversion mechanism, and a pulling apparatus for closely contacting the friction members to the tire by preventing a reverse rotation using the reverse rotation prevention unit wherein the straight line movement conversion mechanism pulls the other ends of the friction members in the center direction of the tire based on the moment applied the handle.

4 Claims, 14 Drawing Sheets

CHAIN FOR TIRE

CROSS REFERENCE TO RELATED APPLICATIONS

The disclosures in Korean Application No. 1999-34643, filed Aug. 20, 1999, Korean Application No. 2000-10236, filed Feb. 29, 2000, and International Application No. PCT/KR00/00927, filed Aug. 19, 2000, are hereby incorporated by reference.

BACKGROUND OF THE INVENTION

1. Field of the Invention

The present invention relates to an apparatus for stable preventing a slipping of a tire when a vehicle runs on a snow road or an iced road, and in particular to an apparatus for preventing a slipping of a tire capable of easily separating a tire slipping preventing apparatus from a tire and being tightly and stable engaged to the tire.

2. Description of the Background Art

A tire slipping prevention apparatus is a winter season vehicle stability apparatus engaged to a tire capable of preventing a tire slipping when a vehicle runs on a snow road or an iced road. A well known conventional tire slipping prevention apparatus is a snow chain which includes a plurality of chains arranged on an outer surface of a tire which contacts with a ground and attached to the outer surface of the same and two wires for connecting the ends of the chains at both sides of the tire.

In the tire slipping prevention apparatus, the snow chain is capable of enhancing a friction coefficient of an outer surface of the tire which contacts with a ground and capable of supporting the entire weight of a vehicle. In addition, the snow chain must be easily detachable because it is used for only a snow road and iced road. Therefore, a snow chain formed of a metallic chain and wire is generally used for satisfying the above-described condition. However, the conventional metallic snow chain does not have an elastic force and is protruded from a grounding surface of the tire and does not have a certain flexibility, so that the snow chain is not engaged to a grounding surface of the tire. Therefore, when a vehicle runs on the road, a vibration and noise occur for thereby significantly decreasing a vehicle riding feeling. In addition, the tire and road may be damaged due to a local pressure of the snow chain.

In order to overcome the above problems, recently, a tire slipping prevention apparatus having friction members each having a certain width and formed of a synthetic resin or a rubber is generally used.

As shown in FIGS. 1 and 2, a conventional tire slipping prevention apparatus includes a plurality of friction members 2 closely engaged to a ground surface 100a of a tire 100 in a horizontal direction and arranged along the grounding surface 100a of the same, and two wires 1 and 3 each having a certain length shorter than a surrounding length of the tire 100 in a state that ends of each of the friction members 2 are fixed to a certain distance. Wire 1 has coupling members 10 engaged to both ends of the wire 1 so that the coupling members 10 are connected to each other at an inner side of the tire 100 for thereby forming a circle having a diameter smaller than the outer diameter of the tire 100. A method for engaging a conventional tire slipping prevention apparatus will be explained as follows.

First, the friction members 2 are arranged on a ground in a longitudinal direction in front of the tires of a vehicle, and then the vehicle is moved by a certain distance, so that the tires 100 are placed on the friction members 2. Both ends of each of two wires 1 and 3 placed in an inner and outer portion of the tire 100 are connected to each other for thereby forming a closed circle shape. Therefore, the friction members 2 are pulled in the center direction of the tire 100 by the wires 1 and 3, so that the friction members 2 are closely attached to the grounding surface 100a of the tire 100. In this state, when the vehicle runs, the friction members 2 contact with a slipping ground before the grounding surface 100a of the tire 100 contacts with the slipping ground for thereby preventing a slipping of the tire 100.

As shown in FIG. 2, the conventional tire slipping prevention apparatus has advantages in that since the soft friction members 2 having a certain area determined based on its width with are tightly engaged to the grounding surface 100a of the tire 100, a vibration and noise are significantly decreased when a vehicle runs. Therefore, a vehicle riding feeling is not decreased compared to the metallic snow chain.

However, in the conventional tire slipping prevention apparatus, since the friction members 2 contact with a grounding surface 100a based on only a tension force based on a hoop stress of the wires 1 and 3 which each have an engaging margin because the friction members 2 do not have an certain electric force, when the friction members 2 contact with the ground when a vehicle runs, the friction members 2 are moved in the radial direction of the tire 100, so that a slipping prevention effect is decreased, and a severe friction noise occurs.

In addition, it is impossible to adjust the lengths of the wires 1 and 3 and the friction members 2, so that the tire slipping prevention apparatus is used only for a tire 100 having a certain standard size.

SUMMARY OF THE INVENTION

Accordingly, it is an object of the present invention to provide an apparatus for preventing a slipping of a tire which overcomes the problems encountered in the conventional art and is easily and quickly engaged to and disengaged from the tires. In addition, the tire slipping prevention apparatus according to the present invention may be used for various size tires irrespective of the standard of the tires.

To achieve the above objects, there is provided an apparatus for preventing a slipping of a tire which includes a wire having separable coupling units connected at both ends of the wire at an inner side of a tire for thereby forming a circle shape having a diameter smaller than an outer diameter of the tire, a plurality of friction members each having one end connected to the wire at a certain regular distance and extended from the wire across a grounding surface of the tire to an outer side of the tire and arranged along a grounding surface of the tire at a certain regular distance, a straight line movement conversion mechanism inserted in an outer center portion of the tire for converting a moment generated in a handle in a radial direction from the center into a tension force in the center direction and applying the tension force to the other ends of the friction members, a reverse rotation prevention unit for preventing a reverse rotation of the straight line movement conversion mechanism, and a pulling bar for connecting a pair of neighbouring friction members with a straight line movement conversion mechanism.

The tire slipping prevention apparatus according to the present invention is engaged in a state that the vehicle is stopped. The above engaging procedure will be explained as follows.

First, in a state that the vehicle is stopped, the wire is connected in the inner side of the tire and forms a circle shape. The pulling bars which connect the ends of each friction member by two are extended in the direction of the center of the tire across the grounding surface of the tire, and the straight line movement conversion mechanism is engaged to the center of the pulling bar. The handle is rotated until the handle is not rotated, and the reverse rotation of the handle is stopped by the reverse rotation prevention unit. In the tire slipping prevention apparatus according to the present invention, each friction member is extended in the direction of the center of the tire by the pulling bars which are moved in the direction of the center of the tire by the straight line movement conversion mechanism and is engaged to the tire based on a close contact with the grounding surface of the tire.

In the tire slipping prevention apparatus according to the present invention, in a state that the vehicle is stopped, the friction members are engaged to the straight line movement conversion mechanism by two at one time using the pulling bar, and then the friction members are extended using the straight line movement conversion mechanism. Therefore, it is possible to engage and disengage the tire slipping prevention apparatus based on a simple procedure. Therefore, it is convenient to use the same.

In the case that the friction member by which the tire does not easily slip based on the close contact with the ground is formed of a band shaped friction member of a certain soft material like urethane, foamed resin, rubber, etc. in a flat shape, the tire slipping prevention effect is enhanced. In addition, the vibration and noise are decreased, and it is comfortable in the vehicle.

In addition, the diameter of the circle formed by the friction members in a state that the friction members are extended is different based on the number of the rotations of the handle. Namely, the diameter of the circle formed by the friction members which surround the outer portion of the tire is variable proportionally to the number of the rotations of the handle. Therefore, the tire slipping prevention apparatus according to the present invention may be adaptable to various kinds of tires.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The embodiments of the present invention will be explained with reference to the accompanying drawings.

Figure 1:
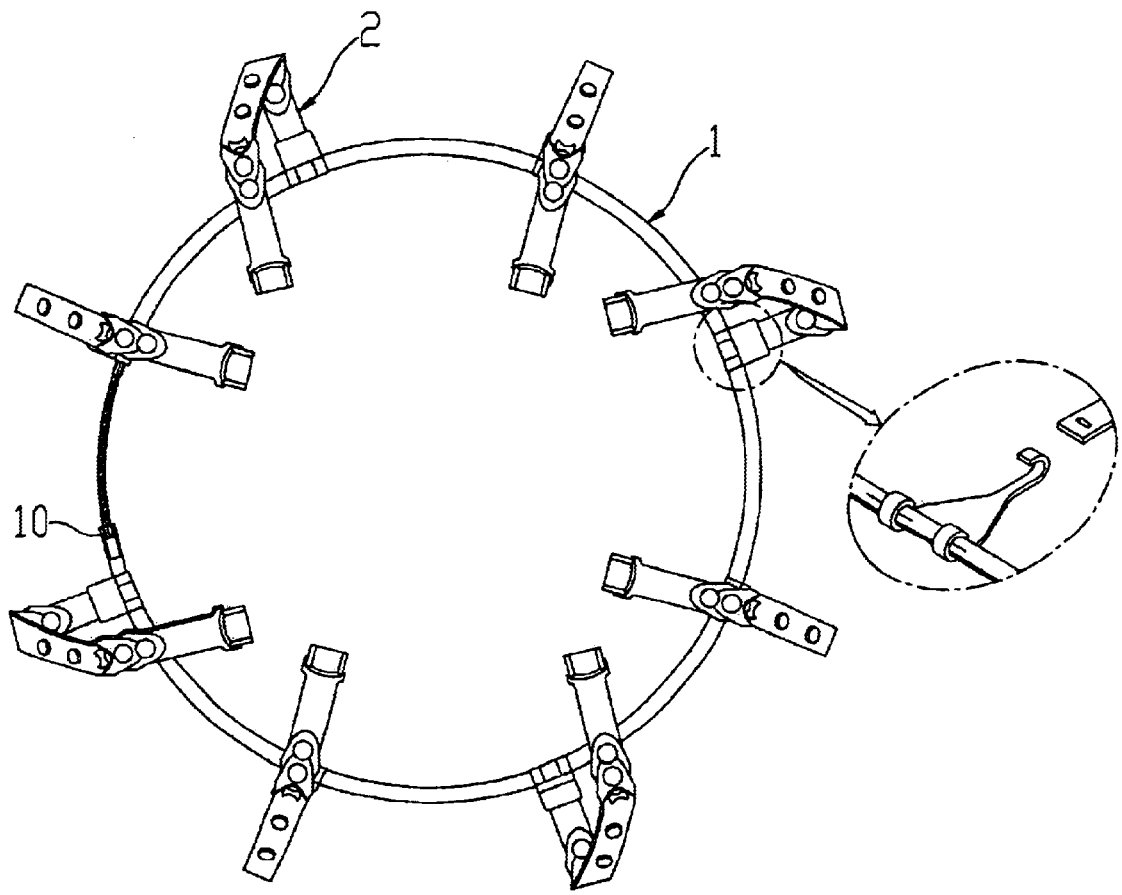
FIG. 1 is a perspective view illustrating a conventional tire slipping prevention apparatus.
Figure 2:
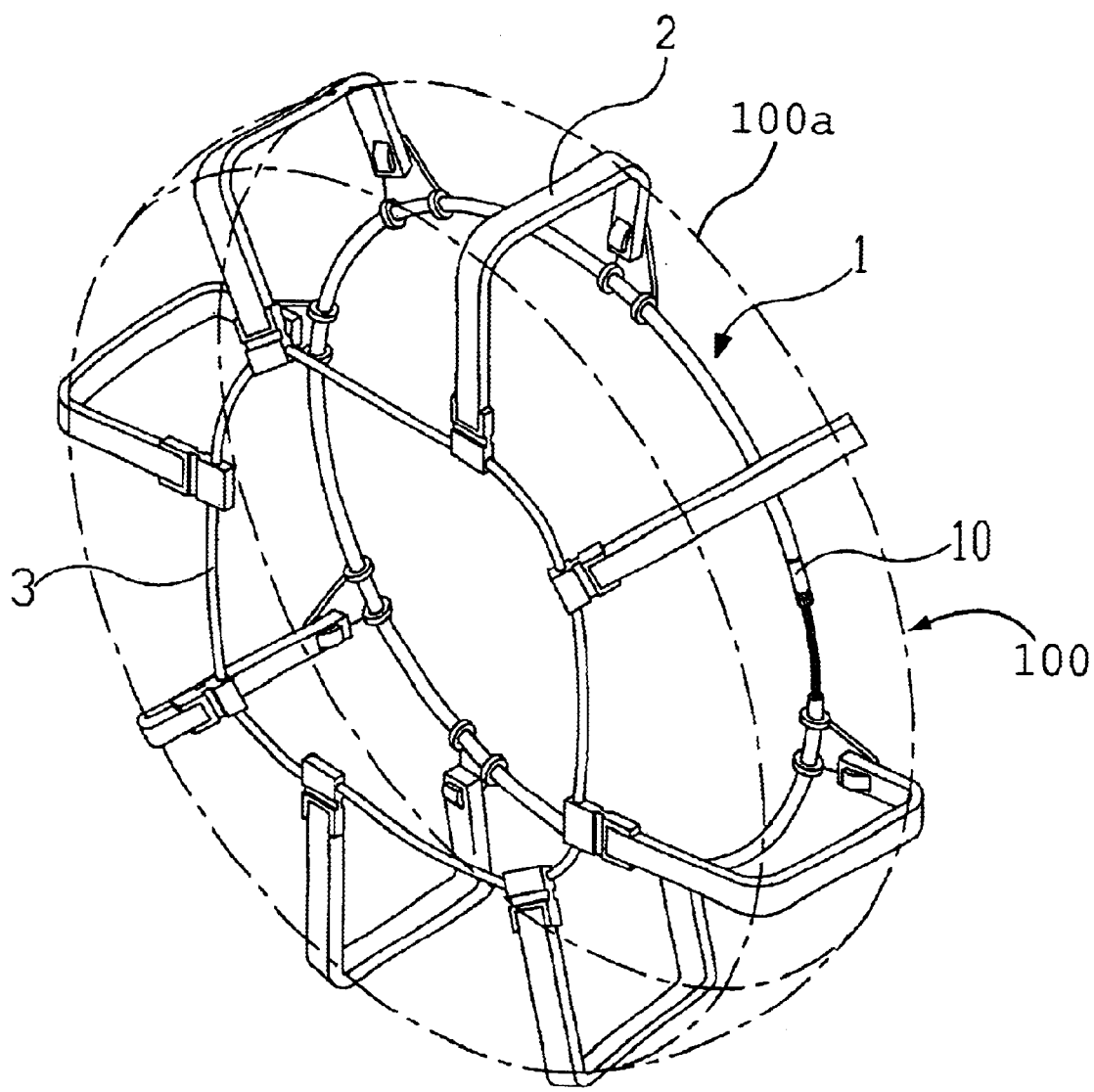
FIG. 2 is a view illustrating the use of a conventional tire slipping prevention apparatus.
Figure 3:
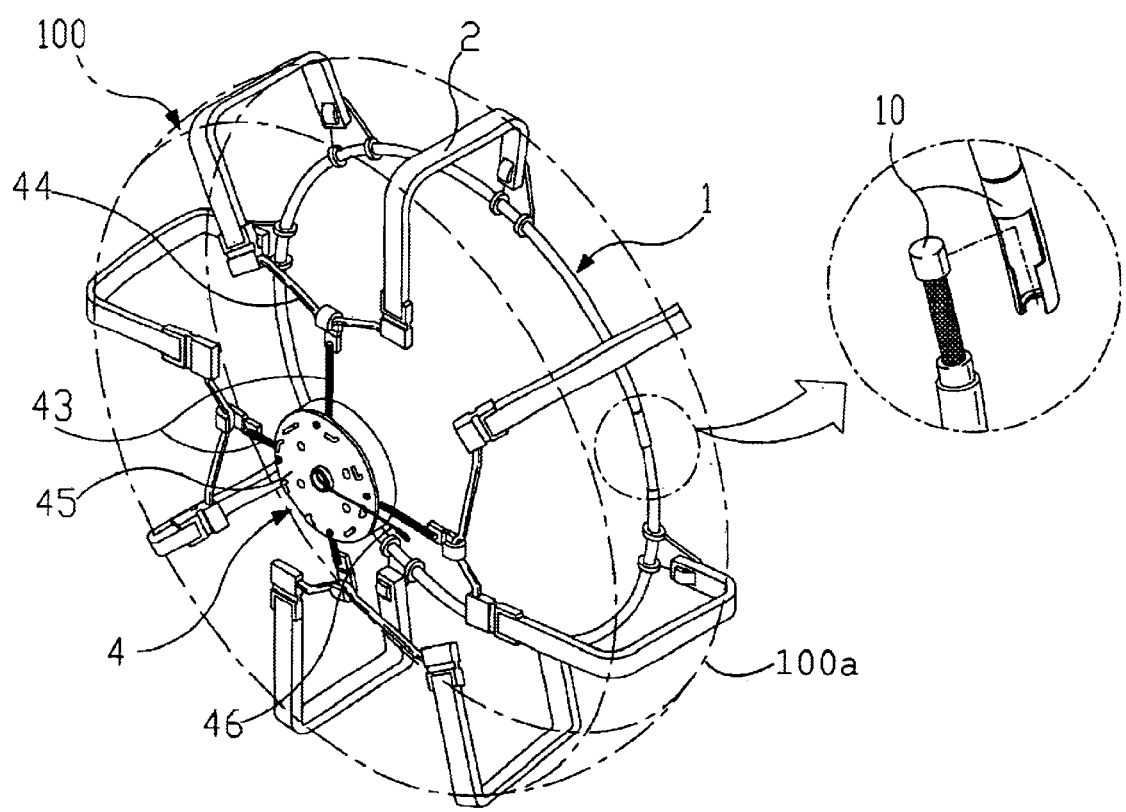
FIG. 3 is a perspective view illustrating a tire slipping prevention apparatus according to a first embodiment of the present invention.

FIG. 3 is a perspective view illustrating an apparatus for preventing a slipping of a tire according to a first embodiment of the present invention.

As shown therein, a tire slipping prevention apparatus includes a wire 1 having both connected ends and an outer diameter smaller than the diameter of a tire, eight friction members 2 fixed to the wire 1 at a certain distance, four pulling bars 44 for binding the friction members 2 in two pads, a straight line movement conversion mechanism 4 for pulling the pulling bars 44 to the center of the tire using four pulling wires 43, and cover hooks 45a (FIG. 4) installed in the straight line movement conversion mechanism 4 for operating as a reverse rotation prevention unit for preventing a reverse rotation of the straight line movement conversion mechanism 4.

The wire 1 is formed of a steel wire having a length smaller than a surrounding length of the tire and includes coupling members 10 engaged to both ends of the wire 1, so that the coupling members 10 are connected to each other at an inner side of the tire 100 for thereby forming a circle having a diameter smaller than the outer diameter of the tire 100.

The friction members 2 are formed of a flexible material like a urethane, foamed resin or rubber and each have a certain length. One end of each of the friction members 2 is fixed to the wire 1 at a certain distance. The friction members 2 are extended to the outer portion of the grounding surface 100a of the tire 100 from the wire 1 having two ends connected for thereby forming a circle shape. Each of the other ends of the friction members 2 is extended toward the center of the tire 100 from the outer portion of the tire 100. The friction members 2 are closely contacted with the grounding surface 100a of the tire 100 and directly contact with a ground surface when a vehicle runs on a road for thereby preventing a slipping of the tire. The lengths and the number of the friction members 2 may be determined based on the size of the tire 100 and may be formed of a metallic chain.

The pulling bars 44 are formed of a steel bar having a smoothly curved center portion, and two friction members 2 are engaged to both ends of each of the pulling bars 44 for thereby connecting two friction members 2 to the straight line movement conversion mechanism. Therefore, the straight line movement conversion mechanism 4 pulls the friction members 2 by two in the direction of the center of the tire 100. As a result, since the pulling bars 44 connect the friction member 2 to the straight line movement conversion mechanism 4 by two, it is possible to quickly and easily engage the tire slipping prevention apparatus to the tire 100.

Figure 4:
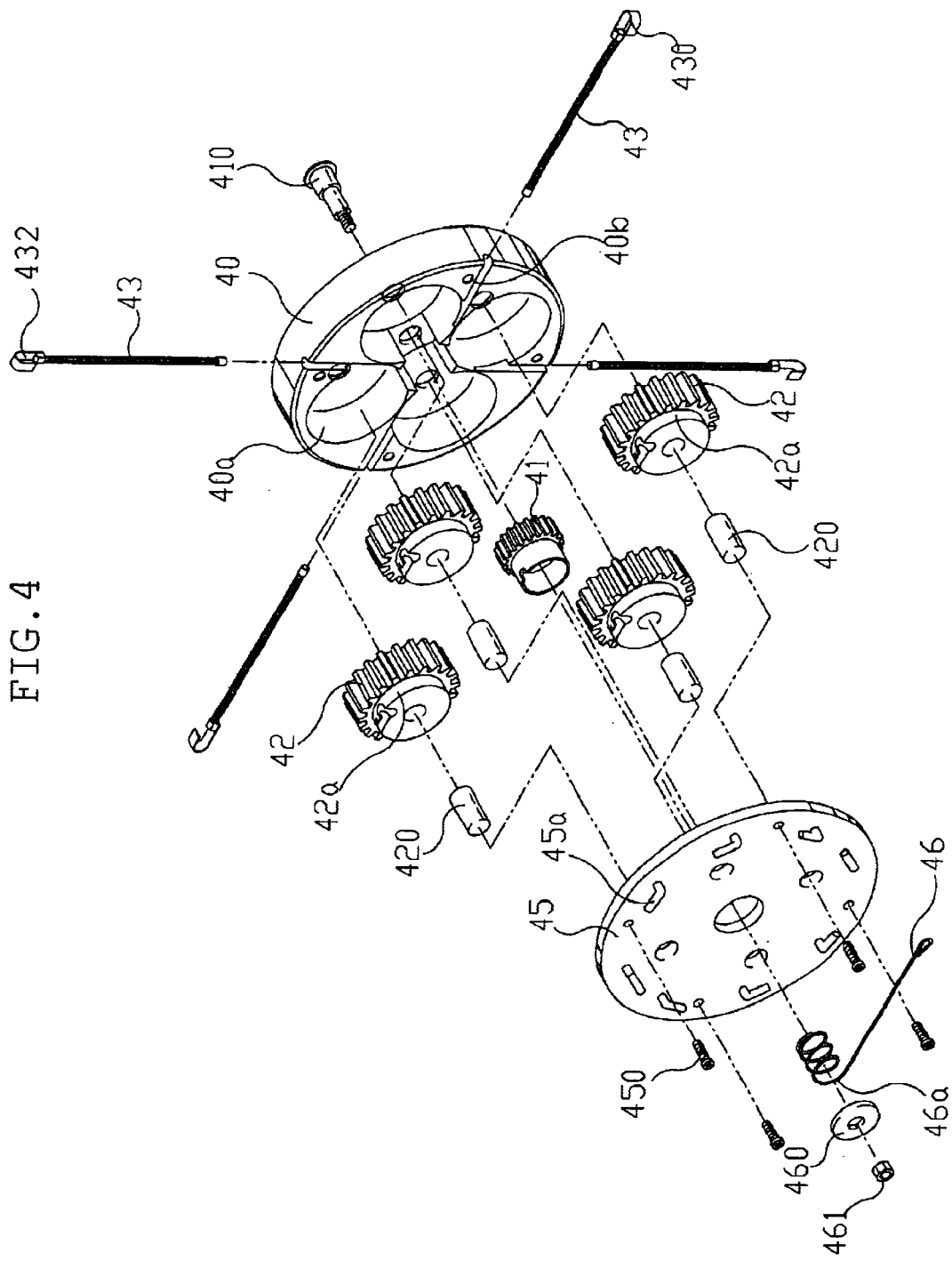
FIG. 4 is a disassembled view illustrating a tire slipping prevention apparatus according to a first embodiment of the present invention.

The straight line movement conversion mechanism 4 converts a rotation force applied to the handle 46 from the outside of the tire 100 into a tension force and pulls the pulling bars 44 in the center direction of the tire 100. As shown in FIG. 4, the straight line movement conversion mechanism 4 includes a housing 40, a sun gear 41 installed in the center portion of the housing 40, four planet gears 42 engaged with the sun gear 41 at the surrounding portion of the sun gear 41, a four-stripe pulling wire 43 inserted from the outside of the housing 40 and wound on four planet gears 42, a cover 45 attached on the housing 40 for preventing an escape of the gears 41 and 42, and a handle 46 dynamically connected with the sun gear 41 from the outside of the cover 45.

The housing 40 is a circular shape casing and includes a groove at the center portion of the same for receiving the sun gear 41 and four grooves formed in the surrounding portions of the same into which the planet gears 42 are inserted. In addition, a groove 40b is formed in a radial direction for guiding a movement of the pulling wire 43. The housing 40 rotatably fixes the sun gear 41 and the planet gears 42 which are inserted into the corresponding grooves and guides the axial direction movement of the pulling wire 43.

The sun gear 41 is fixedly inserted onto the rotation shaft 410 which is rotatably supported by the housing 40 at the center portion of the housing 40 and is rotated by the rotation of the handle 46 engaged to the rotation shaft 410.

The planet gears 42 are pinion gears which are arranged around the sun gear 41 and are engaged with the sun gear 41 and are rotatably supported by a fixing pin fixed to the housing 40. One end of the pulling wire 43 is fixed to one side of the planet gear 42. The planet gears 42 include a winding portion 42a onto which the pulling wire 43 is wound. The planet gears 42 are rotated by the rotation of the sun ear 41 and winds the pulling wire 43 onto the winding portion 42a and pulls the winding wire 43 in the center direction of the housing 40.

The pulling wire 43 is formed of a flexible wire and includes a lower end which is inserted through the groove 40b of the housing 40 and is fixed in the winding portion 42a of the planet gears 42. A pulling hook 430 is installed at the end portion of the pulling wire 43 for engaging with the pulling bar 44. The pulling wire 43 is wound onto the planet gears 42 which is rotated by the sun gear 41 for thereby pulling the pulling bar 44 in the center direction of the housing 40.

The cover 45 covers the opened portion of the housing 40 for thereby preventing an escape of the sun gear 41 and the planet gears 42 provided in the housing 40 and is fixed to the housing 40 by a bolt 450. A plurality of cover hooks 45a are formed in the edge portion of the cover 45 in the counter clockwise direction for preventing a reverse rotation of the handle 46 and operate as a reverse rotation prevention member of the straight line movement conversion mechanism 4. The cover hooks 45a prevent the reverse rotation of the handle 46 which has an operational force in the clockwise direction.

The handle 46 is a rotation bar engaged to the rotation shaft 410 which fixes the sun gear 41 to the housing 40, using the bolt 461 by inserting a washer 460 onto the rotation shaft 410. The rotation force applied at the end portion of the handle 46 rotates the sun gear 41. In addition, in a state that the handle 46 is rotated by a certain degree, the handle 46 is hooked by the cover hooks 45a of the cover 45 for thereby stopping the reverse rotation of the same, so that the sun gear 41 is not reversely rotated. A fixing end portion of the handle 46 includes a screw shape elastic variation portion 46a for elastically supporting the sun gear 41 with respect to the cover hooks 45a . Therefore, the handle 46 is rotated until the sun gear 41 is not rotated, and the end portion of the same is engaged to the cover hooks 45a using an elastic variation of the elastic variation portion 46a , so that the sun gear 41 elastically supports the reverse rotation prevention member, namely, the cover hooks 45a by the handle 46. As a result, the elastic variation portion 46a of the handle 46 elastically fixes the sun gear 41 in a state that the sun gear 41 is rotated in maximum.

The apparatus for preventing a slipping of a tire according to the present invention is engaged to a tire by the following processes.

First, in a state that a vehicle is stopped, both ends of the wire(1 of FIG. 3) are connected at the inner side of the tire for thereby forming a circle. The friction members 2 which are fixed to the wire 1 and connected with the pulling bar 44 by two are extended across the grounding surface of the tire and extended to the outer center of the tire. The pulling wire 43 of the straight line movement conversion mechanism 4 is connected with the pulling bar 44 for thereby temporarily fixing the straight line movement conversion mechanism 4. The handle 46 of the straight line movement conversion mechanism 4 is rotated in the counterclockwise direction until it is not rotated, and the end of the same is engaged with the cover hook 45a of the cover 45. The handle 46 is engaged with the cover hook 45a which is elastically extended by the elastic variation portion 46a . In this process, the pulling wire 43 is pulled by the straight line movement conversion mechanism 4, so that the friction members 2 are extended. Therefore, the friction members 2 are closely attached to the tire 100, and the tire slipping prevention apparatus according to a first embodiment of the present invention is engaged to the vehicle by the tension force between the pulling wire 43 of the straight line movement conversion mechanism 4 and the friction members 2.

In the tire slipping prevention apparatus according to a first embodiment of the present invention, the friction members are easily connected with the straight line movement conversion mechanism 4 by two, and the above connection is implemented without moving the vehicle. Therefore, a quick and easier attaching and detaching operation is implemented. In addition, the friction members 2 which contact with the ground based on the close contact with the grounding surface 100a of the tire 100 are flat and is closely and stably contacted with the grounding surface 100a of the tire, so that it is possible to prevent any noise and vibrations when the vehicle runs.

Figure 6:
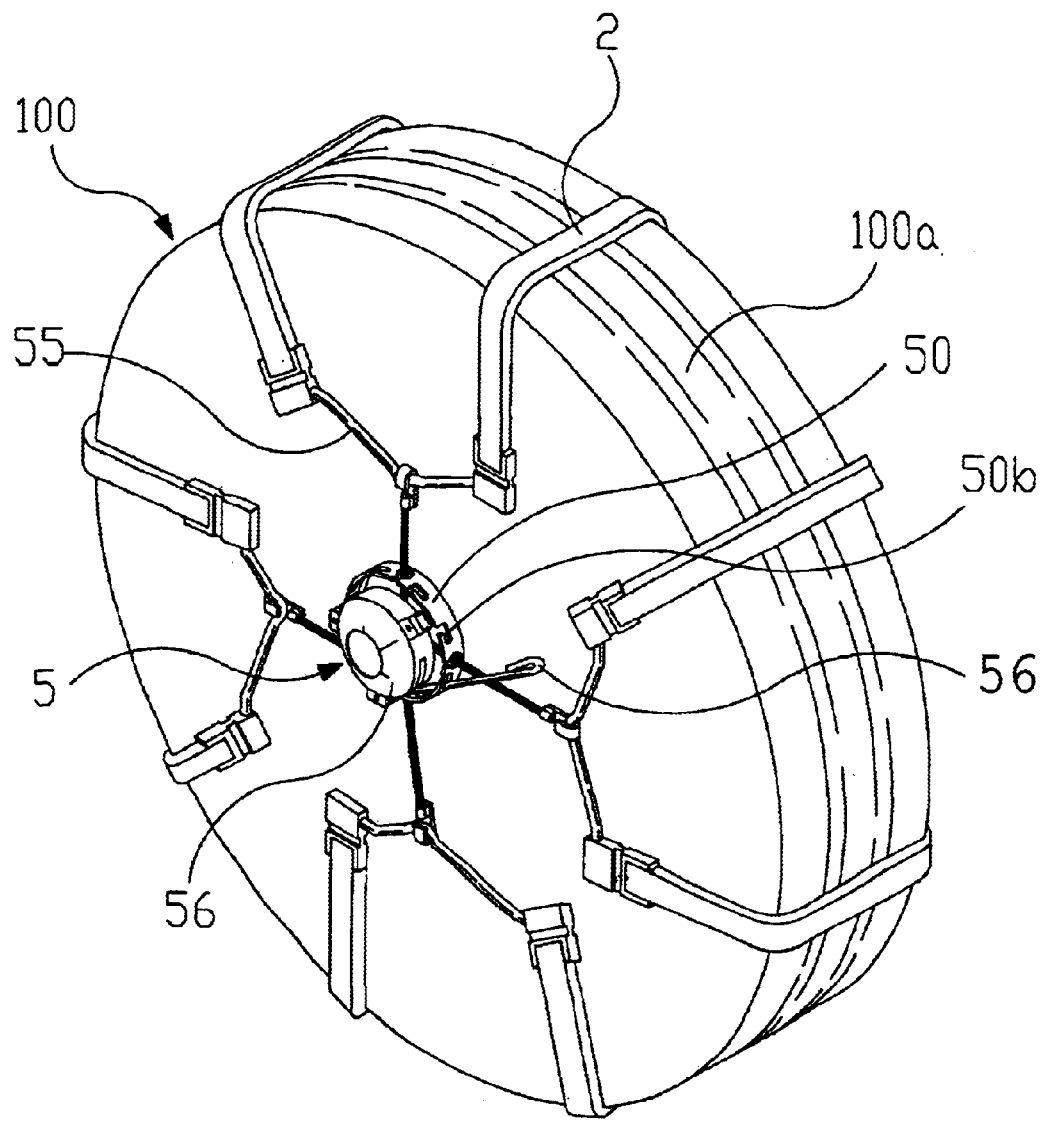
FIG. 6 is a view illustrating the use of a tire slipping prevention apparatus according to a second embodiment of the present invention.
Figure 7:
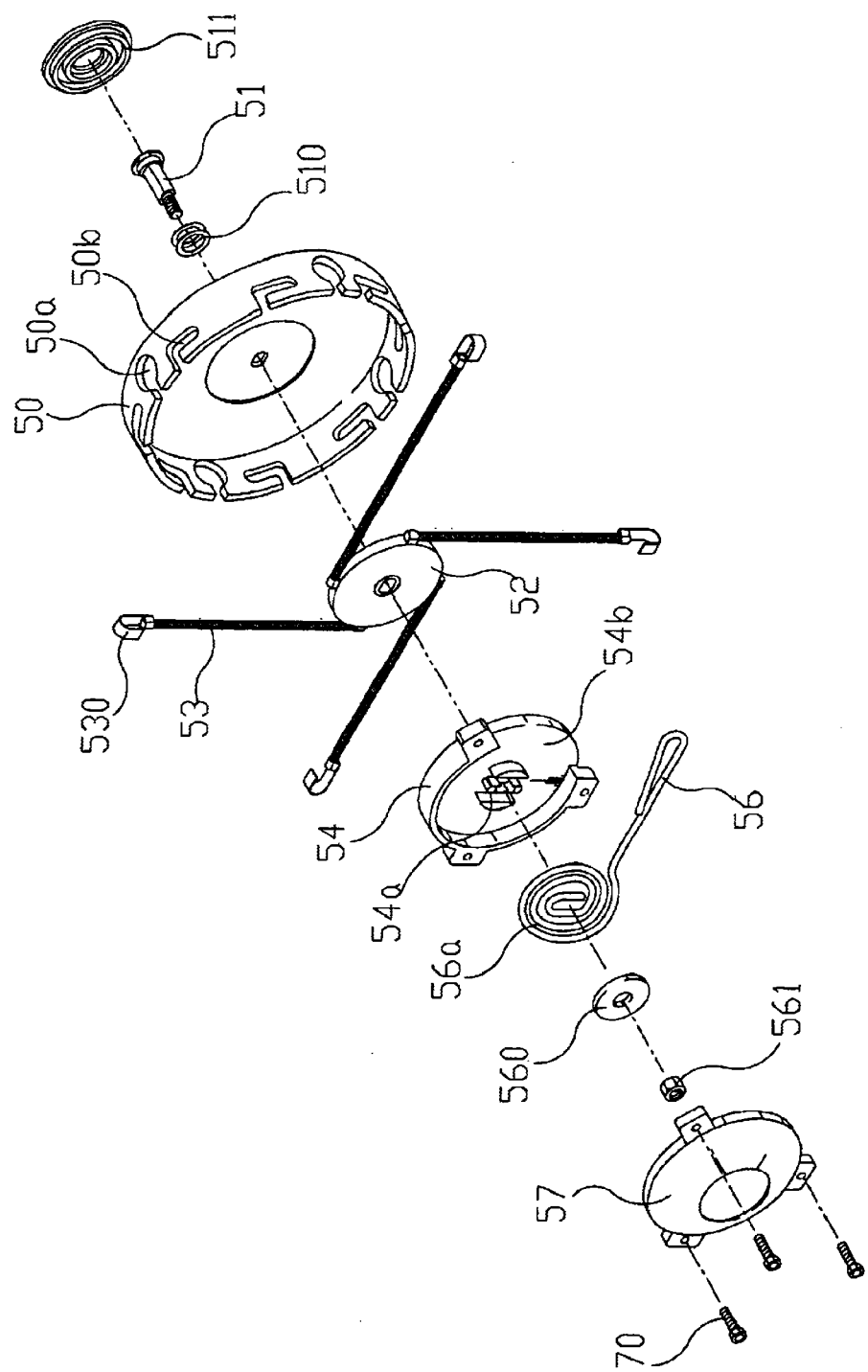
FIG. 7 is a disassembled perspective view illustrating a tire slipping prevention apparatus according to a second embodiment of the present invention.

As shown in FIGS. 6 and 7, the tire slipping prevention apparatus according to a second embodiment of the present invention includes a wire (1 of FIG. 3) having both ends connected each other at the inner side of the tire and having a circle having an outer diameter smaller than the tire 100, eight friction members 2 fixed to the wire 1 at a certain distance, four pulling bars 55 for binding the friction members 2 by two, a straight line movement conversion mechanism 5 for pulling the pulling bars 55 (FIG. 6) in a center direction of the tire 100 using four stripe pulling wires 53, and engaging grooves 50b formed in the straight line movement conversion mechanism 5 as a reverse rotation prevention member capable of preventing a reverse rotation of the straight line movement conversion mechanism 5.

The wire 1 is formed of a steel wire having a length shorter than the surrounding length of the tire and has coupling members 10 at both ends of the same which are coupled each other. The coupling members 10 are coupled at the inner side of the tire 100 and form a circle shape having an outer diameter smaller than the outer diameter of the tire 100.

The friction members 2 are flat pads formed of a flexible material like urethane, foamed resin or rubber. One end of each of the friction members 2 is fixed to the wire 1 at a certain distance. The friction members 2 are extended from the wire 1 which has both ends connected to each other at the inner side of the tire 100 and forms a circle shape to the outside of the grounding surface 100a of the tire 100, and the other ends of the same are extended from the outside of the tire 100 to the center of the tire 100. The friction members 2 directly closely contact with the grounding surface 100a of the tire 100 for thereby preventing a slipping of the tire when a vehicle runs. The length and number of the friction members 2 are determined based on the size of the tire 100 and may be formed of a metallic chain.

The pulling bars 55 are formed of a steel bar having a smoothly curved center portion, and two friction members 2 are engaged to both ends of each of the pulling bars 55 for thereby connecting two friction members 2 to the straight line movement conversion mechanism. Therefore, the straight line movement conversion mechanism 5 pulls the friction members 2 by two in the direction of the center of the tire 100. As a result, since the pulling bars 55 connect the friction member 2 to the straight line movement conversion mechanism 5 by two, it is possible to quickly and easily engage the tire slipping prevention apparatus to the tire 100.

The pulling bar 55 has a curved center portion. Both ends of the pulling bar 55 are connected with the neighbouring two friction members 2 for thereby pulling the two friction members 2 in the center direction of the tire 100.

Figure 5:
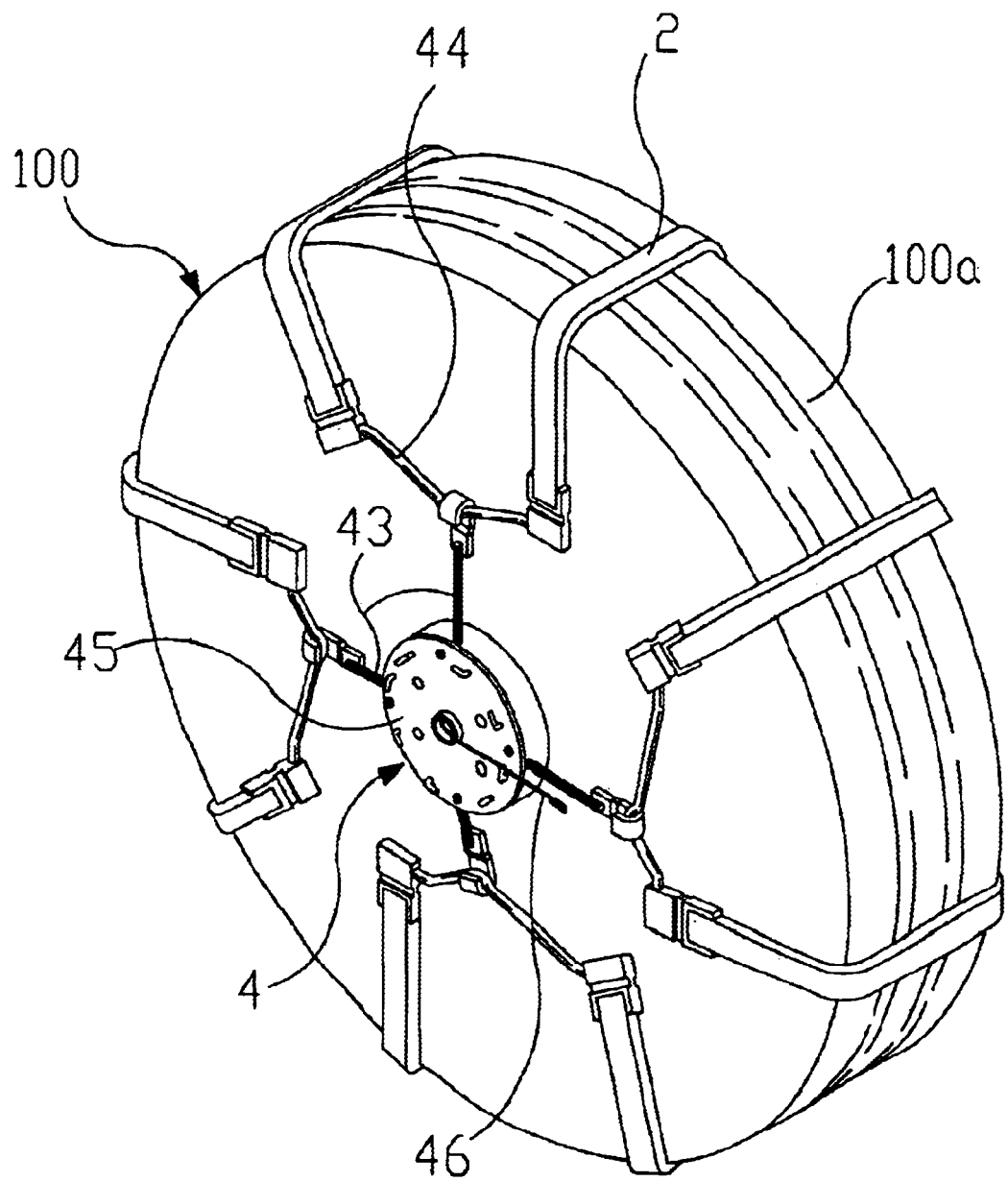
FIG. 5 is a view illustrating the use of a tire slipping prevention apparatus according to a first embodiment of the present invention.

The straight line movement conversion mechanism 5 converts a rotational force applied to the handle 56 from the outside of the tire 100 into a tension force in a center direction of the tire and pulls the pulling bar 55 in the center direction of the tire 100. As shown in FIGS. 5 and 6, the straight line movement conversion mechanism 5 includes a housing 50, a rotation plate 52 rotatably installed at the center portion of the housing 50, a handle fixing plate 54 rotated integrally with the rotation plate 52, a four-stripe pulling wire 53 inserted from the outside of the housing 50 and wound onto the rotation plate 52, a handle 56 fixed to the handle fixing plate and dynamically connected with the rotation plate 52, and a fixing plate cover 57 for covering the handle fixing plate 54 and shielding the handle 56.

The housing 50 is a tray shape casing having a trim at an edge portion of the same. Grooves 50a and engaging grooves 50b are alternately formed along the rim of the housing 50. In the housing 50, the rotation plate 52 passes through the center portion of the housing 50 and is inserted onto the rotation shaft 51 which is rotatably engaged to the housing 50 using a washer 510.

The rotation plate 52 is a circular plate which is rotatably installed in the interior of the housing 50 and has a certain thickness for thereby winding the pulling wire 53 wound on the outer surface of the same.

The pulling wire 53 is inserted through the groove 50a of the housing 50 and is connected with an outer portion of the rotation plate 52 and includes a pulling hook 530 engaged by the pulling bar 55. The pulling wire 53 is wound onto the rotation plate 52 for thereby pulling the pulling bar 55 engaged with the pulling hook 530 in the center direction of the housing 50.

The handle fixing plate 54 is a circular plate fixedly inserted onto the rotation shaft 51 which fixes the rotation plate 52 to the housing 50. The handle 56 is fixed to the center portion of the handle fixing plate 54 using a handle fixing structure 54a. A cut portion 54b is formed on an outer portion of the same for thereby forming a certain space in which the handle 56 is freely moved therein in the upper and lower directions. The handle 56 is fixed with respect to the rotation shaft 51, so that the handle 56 is movable in the space.

The handle 56 is a rotation bar fixed to the rotation shaft 51 using the handle fixing plate 54 in a state that the rotation shaft 51 rotatably fixes the rotation plate 52 to the housing 50. The handle 56 is rotated by a rotation force applied to an end portion of the same and rotates the rotation plate 52 through the fixing plate 54 and the rotation shaft 51. In addition, in a state that the handle 56 is rotated by a certain angle, the handle 56 is engaged by the engaging groove 50a of the housing 50 for thereby stopping the reverse movement of the same, so that the rotation plate 52 is not rotated in the reverse direction. A screw shape elastic variation portion 56a is formed at a fixing end portion of the handle 56, so that the rotation plate 52 having a reverse rotation stopped by the engaging groove 50b is elastically supported by the housing 50, namely, the engaging groove 50b when the end portion of the handle 56 is engaged by the engaging groove 50b. Therefore, the handle 56 is rotated until the rotation plate 51 is not rotated, the end portion of the handle 56 is rotated more and engaged by the engaging groove 50b using the elastic variation of the elastic variation portion 56a. Therefore, the rotation plate 52 is elastically supported with respect to the reverse rotation prevention member, namely, the engaging groove 50b by the handle 56. As a result, the elastic variation portion 56a of the handle 56 elastically fixes the rotation plate 52 in a state that the handle 56 is rotated in maximum.

The tire slipping prevention apparatus according to a second embodiment of the present invention is engaged to the tire based on the following processes.

First, in a state that a vehicle is stopped, both ends of the wire (1 of FIG. 3) are connected at the inner side of the tire for thereby forming a circle. The pulling bars 55 fixed to the wire 1 and engaged with the friction members 2 by two are extended in the direction of the center of the tire across the grounding surface of the tire. The pulling wire 53 of the straight line movement conversion mechanism 5 is connected with the pulling bar 55 for thereby temporarily fixing the straight line movement conversion mechanism 5. The handle 56 of the straight line movement conversion mechanism 5 is rotated in the counterclockwise direction until it is not rotated, and the end of the same is engaged with the nearest engaging groove 50b of the housing 50. The handle 56 is elastically varied by the elastic variation portion 56a and is engaged with the engaging groove 50b. In this process, the pulling wire 53 is pulled by the straight line movement conversion mechanism 5, so that the friction members 2 are extended. Therefore, the friction members 2 are closely attached to the tire 100, and the tire slipping prevention apparatus according to a second embodiment of the present invention is engaged to the vehicle by the tension force between the pulling wire 53 of the straight line movement conversion mechanism 5 and the friction members 2.

In the tire slipping prevention apparatus according to the second embodiment of the present invention, the friction members 2 are easily connected to the straight line movement conversion mechanism 5 by two. In addition, the above connection is implemented without moving the vehicle. Therefore, a quick and easier attaching and detaching operation is implemented. The friction members 2 contacting with the ground based on a close contact with the grounding surface 100a of the tire 100 is flat and is closely contacted with the grounding surface 100a of the tire 100 and is stably fixed, so that it is possible to prevent a vibration and noise when a vehicle runs.

Figure 8:
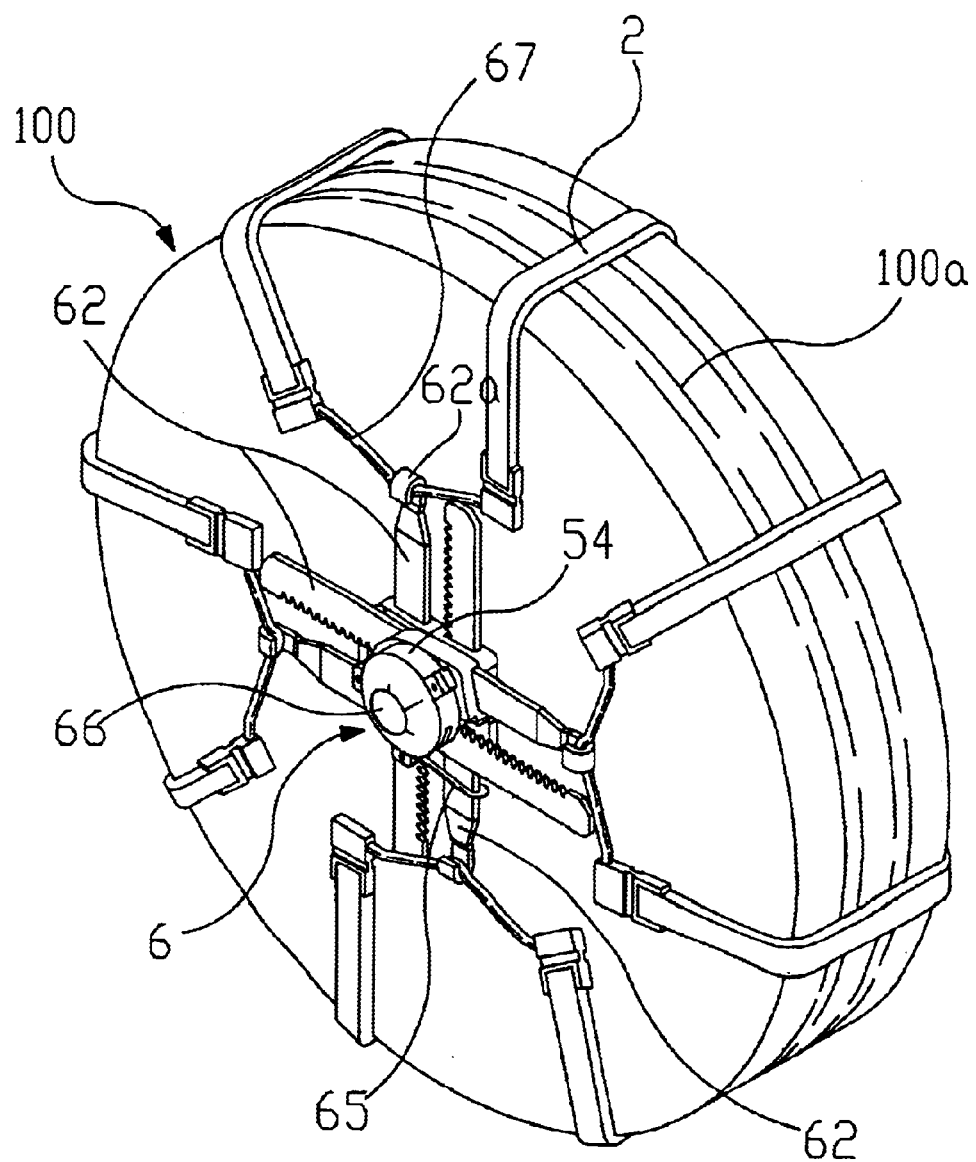
FIG. 8 is a view illustrating the use of a tire slipping prevention apparatus according to a third embodiment of the present invention.
Figure 9:
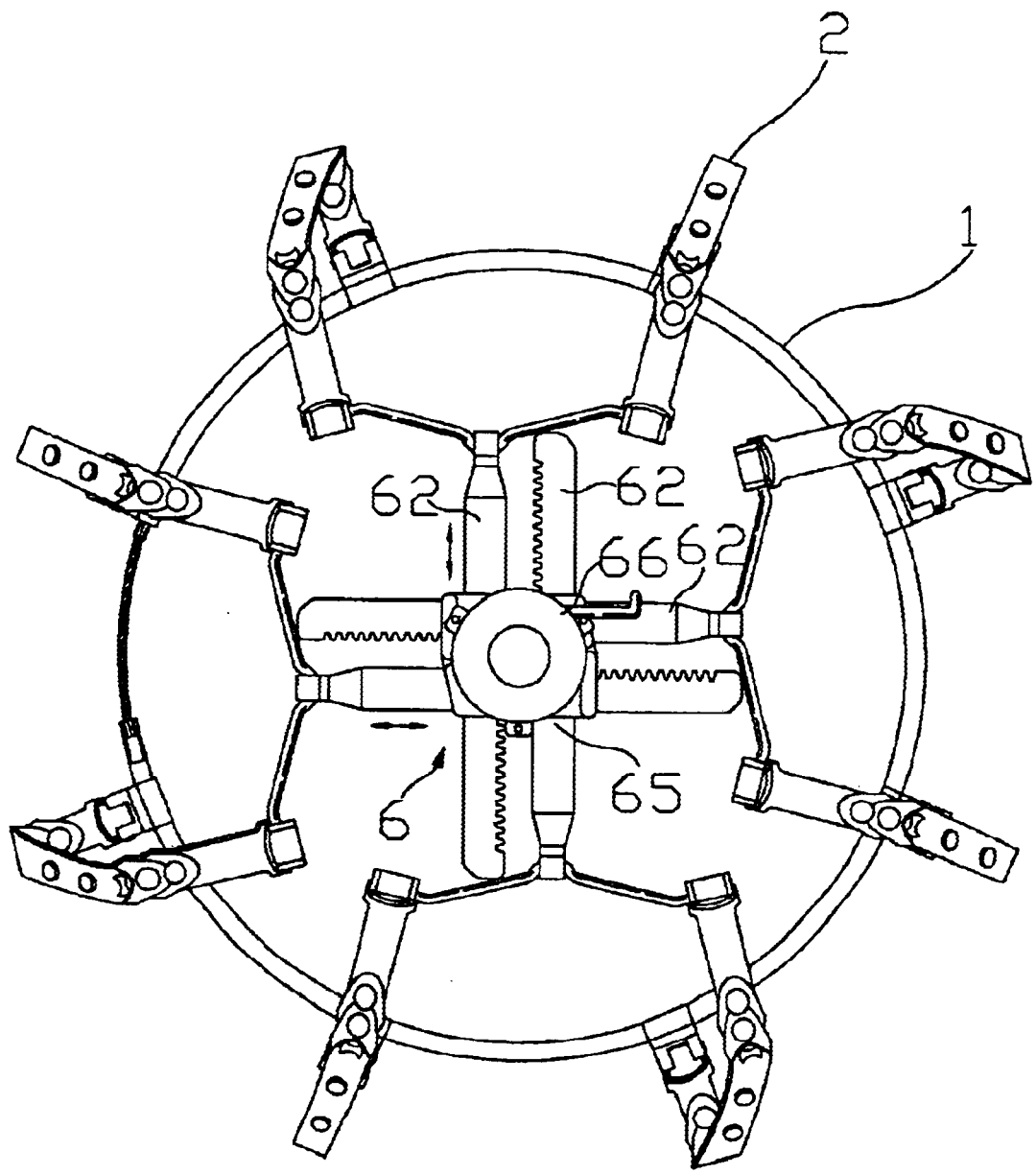
FIG. 9 is a front view illustrating a tire slipping prevention apparatus according to a third embodiment of the present invention.
Figure 10:
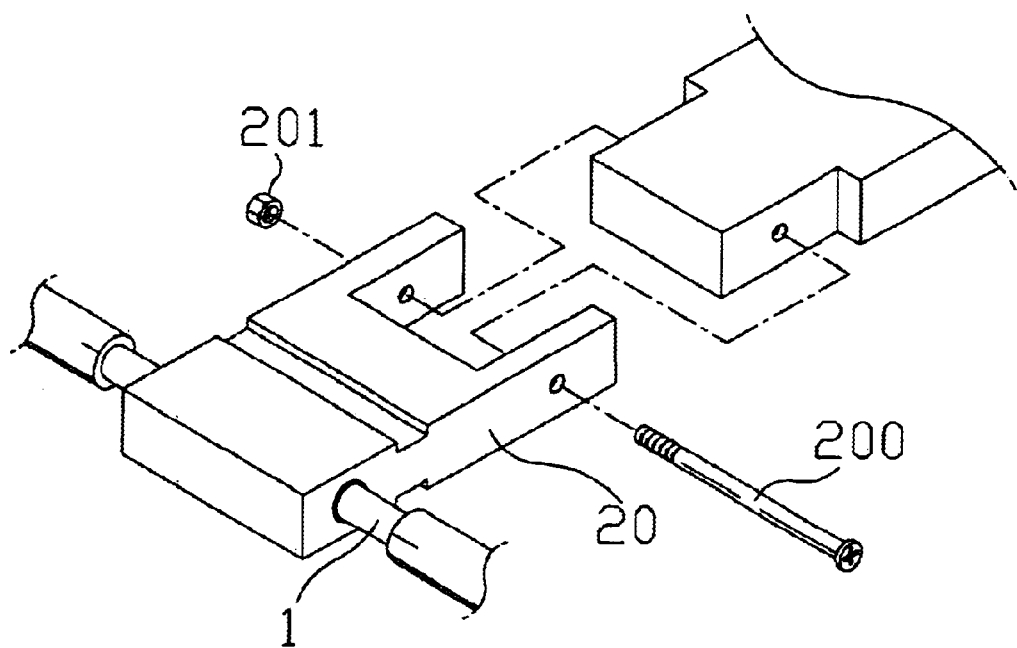
FIG. 10 is an enlarged disassembled perspective view illustrating a connection structure with respect to a wire of a friction member which is commonly used for a tire slipping prevention apparatus according to the present invention.
Figure 11:
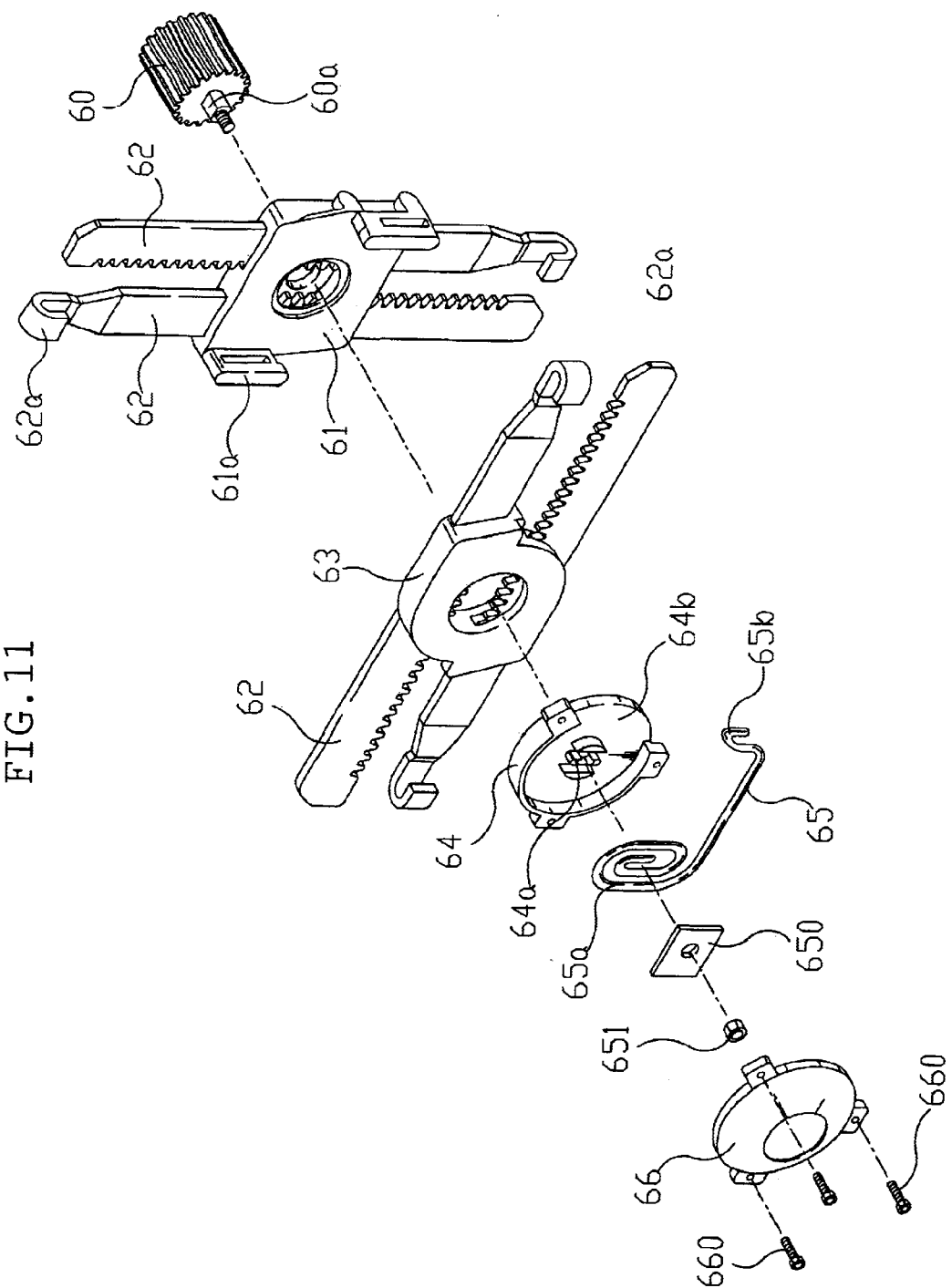
FIG. 11 is a disassembled perspective view illustrating a straight line conversion mechanism of a tire slipping prevention apparatus according to a third embodiment of the present invention.

FIGS. 8 and 9 illustrate a using state and a front view of a tire slipping prevention apparatus according to a third embodiment of the present invention. FIG. 10 is an enlarged disassembled perspective view illustrating a fixing structure with respect to a wire of a friction member used in a tire slipping prevention apparatus according to the present invention, and FIG. 11 is a disassembled perspective view illustrating a straight line movement conversion mechanism according to a third embodiment of the present invention.

As shown in FIG. 8, the tire slipping prevention apparatus according to a third embodiment of the present invention includes a wire (1 of FIG. 3) having both ends connected at the inner side of the tire for thereby forming a circle having a diameter smaller than an outer diameter of the tire 100, eight friction members 2 fixed to the wire 1 at a certain distance, four pulling bars 67 for binding the friction members 2 by two, and a straight line movement conversion mechanism 6 for pulling the pulling bars 67 using four pulling racks 62 in the center direction of the tire 100.

The wire 1 is a steel wire having a length shorter than the surrounding length of the tire and includes a coupling member 10 at both ends of the same. The coupling members 10 are connected at the inner side of the tire 100 for thereby forming a circle having an outer diameter smaller than the outer diameter of the tire 100.

The friction members 2 include a plurality of pads formed of a flexible material such as synthetic resin, urethane, flamed resin or rubber and include a certain length. One end of each of the friction members 2 is fixed to the wire 1 at a certain distance. The friction members 2 are extended from the wire 1 having both ends connected each other at the inner side of the tire 100 for thereby forming a circle to the outside of the grounding surface 100a of the tire 100. The other end of each of the friction members 2 are extended from the outside of the tire 100 in the center direction of the tire 100. The friction members 2 are closely contacted with the grounding surface 100a of the tire 100 for thereby directly contacting with a surface of the road when a vehicle runs and preventing a slipping of the tires. The lengths and number of the friction members 2 are determined based on the size of the tire 100 and may be formed of a metallic chain.

The pulling bars 67 are formed of a steel bar having a smoothly curved center portion, and two friction members 2 are engaged to both ends of each of the pulling bars 67 for thereby connecting two friction members 2 to the straight line movement conversion mechanism. Therefore, the straight line movement conversion mechanism 6 pulls the friction members 2 by two in the direction of the center of the tire 100. As a result, since the pulling bars 67 connect the friction member 2 to the straight line movement conversion mechanism 6 by two, it is possible to quickly and easily engage the tire slipping prevention apparatus to the tire 100.

The straight line movement conversion mechanism 6 converts a rotation force applied to the handle 65 at the outside of the tire 100 into a tension force in the center direction of the tire and pulls the pulling bars 67 in the center direction of the tire 100 and as shown in FIG. 11 includes two housings 61 and 63 coupled to each other, four pulling racks 62 movably installed opposite to each other with respect to the housings 61 and 63, a pinion gear 60 engaged to the two housings 61 and 63 and the pulling racks 62, respectively, a handle fixing plate 64 rotatably installed with respect to the pinion gear 60, a handle 65 fixed to the handle fixing plate 64 and dynamically connected with the pinion gear 60, and a fixing plate cover 66 for covering the handle fixing plate 64 and shielding a part of the handle 65.

The housing 61 and 63 are formed of a vertical rack housing 61 and a horizontal rack housing 63 and are flat-shaped cubic housings formed by two grooves in a vertical and horizontal directions and guide the movement of the pulling rack 62 inserted in each sliding groove to be moved in the opposite direction. In addition, a through hole is formed at each center of the housings 61 and 63, and the pinion gear 60 is inserted through the though hole and is engaged with the pulling rack 62.

The pulling racks 62 are inserted into the housings 61 and 63 by two. The pulling racks 62 are inserted into the housings 61 and 63 to be movable in the opposite direction by the pinion gear 60. A ring portion 62a is formed at an end portion of the pulling rack 62. The ring portion 62a is engaged by the pulling bar 67. Each pulling rack 62 is moved in the center direction by the pinion gear 60 for thereby pulling the pulling bar 67 in the center direction of the tire.

The handle fixing plate 64 is a circular plate installed onto the fixing shaft 60a protruded from the pinion gear 60 and includes a handle fixing structure 64a at the center of the same, and the handle 65 is fixed thereto. A cut portion 64b is formed at an outer portion for thereby forming a certain space in which the handle 65 is movable in the upper and lower directions. The handle fixing plate 64 fixes the handle 65 with respect to the fixing shaft 60a of the pinion gear 60, and provided a certain space in which the handle 65 is elastically movable in the rotation direction.

The handle 65 is a rotation bar fixed to the fixing shaft 60a of the pinion gear 60 by the handle fixing plate 64 and includes an end hook 65b at the end portion of the same and is rotated by a rotation force applied to the end portion of the same for thereby rotating the pinion gear 60. In addition, in a state that the handle 65 is rotated by a certain angle, the end hook 65b is engaged by the pulling bar 62 for thereby stopping the reverse rotation of the handle 65, so that the reverse rotation of the pinion gear 60 is prevented. A screw shape elastic variation portion is formed at a fixing end portion of the handle 65, so that the pinion gear 60 which has a stopped reverse rotation is elastically supported by the pulling rack 62 when the end portion of the handle 65 is engaged with the pulling rack 62. Therefore, the handle 65 is rotated until the pinion gear 60 is not rotated, and the end portion of the handle 65 is rotated more using the elastic variation of the elastic variation portion 65a and is engaged with the more front portion pulling rack 62, so that the pinion gear 60 is elastically supported with respect to the pulling rack 62 by the handle 65. As a result, the elastic variation portion 65a of the handle 65 is elastically fixed in a state that the pinion is rotated in maximum.

FIG. 10 is a view illustrating a fixing structure for fixing the friction members 2 to the wire 1. In FIG. 10, reference numeral 200 represents a fixing pin, and 20 represents a fixing member fixed to the wire 1 for fixing the friction members 2 using the fixing pin 200.

The tire slipping prevention apparatus according to a third embodiment of the present invention will be explained with reference to the accompanying drawings.

First, in a state that a vehicle is stopped, both ends of the wire (1 of FIG. 3) are connected at the inner side of the tire for thereby forming a circle. The friction members 2 which are fixed to the wire 1 and connected with the pulling bar 67 by two are extended across the grounding surface of the tire and extended to the outer center of the tire. The friction members 2 fixed to the wire 1 and connected with the pulling bar 67 by two are extended to the outer center of the tire through the grounding surface of the tire. The ring portion 62a of the pulling racks 62 of the straight line movement conversion mechanism 6 are connected with the pulling bar 67 for thereby temporarily fixing the straight line movement conversion mechanism 6. In this state, the handle 65 of the straight line movement conversion mechanism 6 is rotated in the counterclockwise direction until it is not rotated, and the end hook 65b of the handle 65 is engaged to the nearest pulling rack 62. Therefore, the handle 65 is engaged to the pulling rack 62 based on an elastic variation by the elastic variation portion 65a. In this process, the pulling bar 67 is pulled by each pulling rack 62 in the center direction of the tire, so that the friction members 2 are extended. The friction members 2 are closely contacted with the tire 100, so that the tire slipping prevention apparatus according to a third embodiment of the present invention is engaged to the vehicle as shown in FIG. 8 by a tension force applied between the pulling racks 62 of the straight line movement conversion mechanism 6 and each friction member 2.

In the tire slipping prevention apparatus according to a third embodiment of the present invention, the flat shape friction members 2 are closely contacted with the grounding surface 100a of the tire 100, so that a vibration and noise does not occur when a vehicle runs. In addition, it is possible to engage the tire slipping prevention apparatus to the tires in a state that the vehicle is stopped. It is possible to easily and quickly engage to the tires.

In the tire slipping prevention apparatus according to the third embodiment of the present invention, the friction members 2 are easily connected to the straight line movement conversion mechanism 6 by two. In addition, the above connection is implemented without moving the vehicle. Therefore, a quick and easier attaching and detaching operation is implemented. The friction members 2 contacting with the ground based on a close contact with the grounding surface 100a of the tire 100 is flat and is closely contacted with the grounding surface 100a of the tire 100 and is stably fixed, so that it is possible to prevent a vibration and noise when a vehicle runs.

Figure 12:
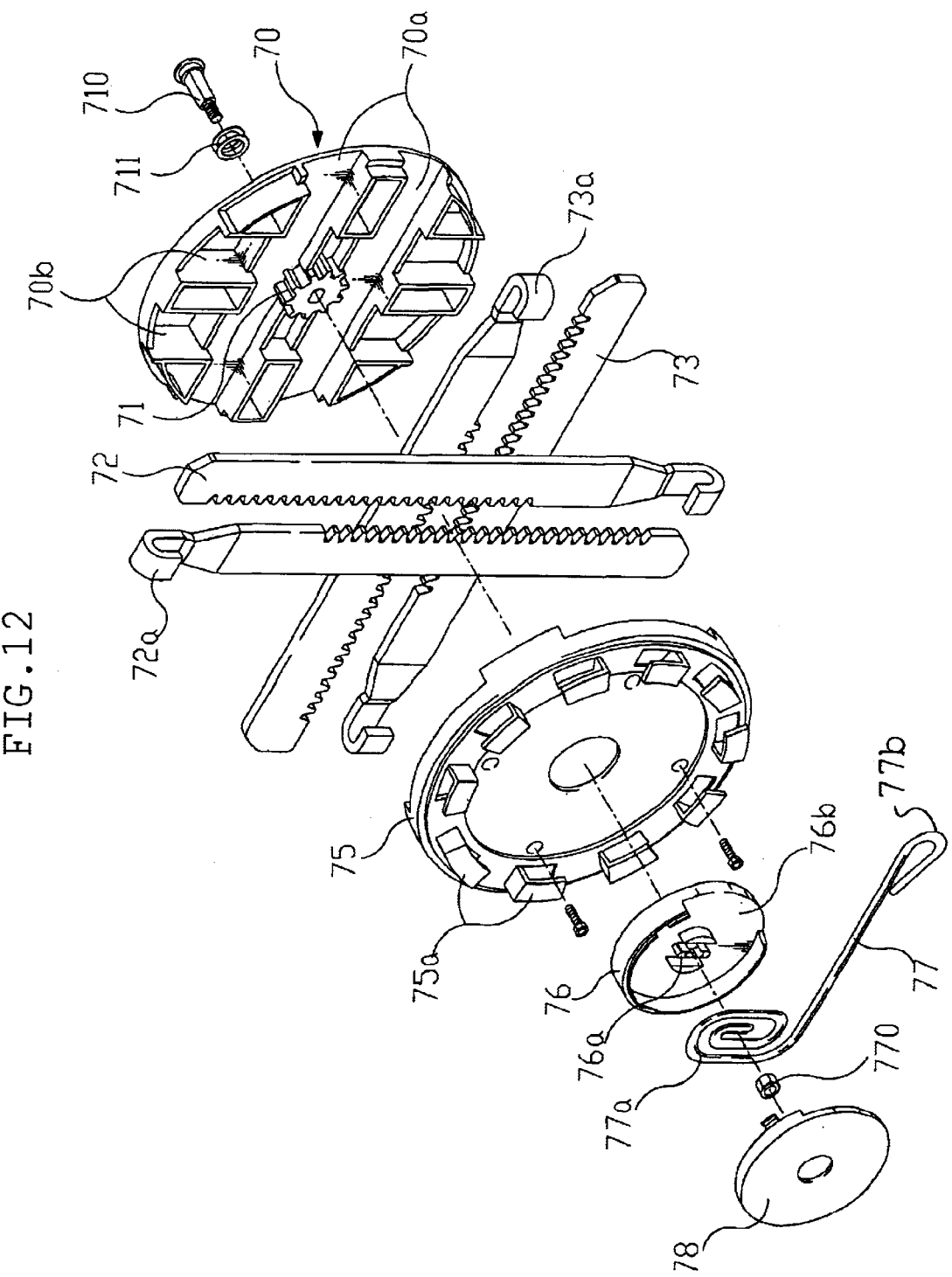
FIG. 12 is a disassembled perspective view illustrating a tire slipping prevention apparatus according to a fourth embodiment of the present invention.
Figure 13:
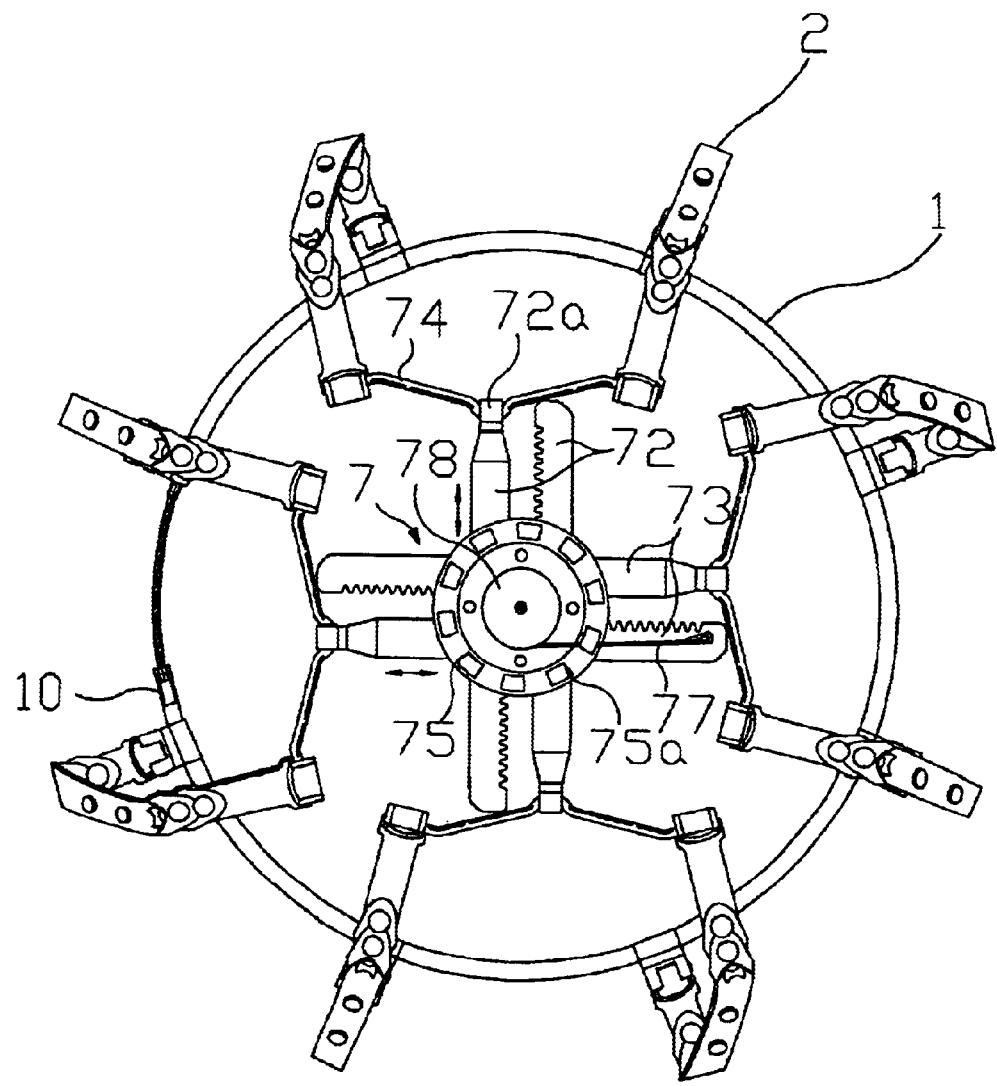
FIG. 13 is a front view illustrating a tire slipping prevention apparatus according to a fourth embodiment of the present invention.
Figure 14:
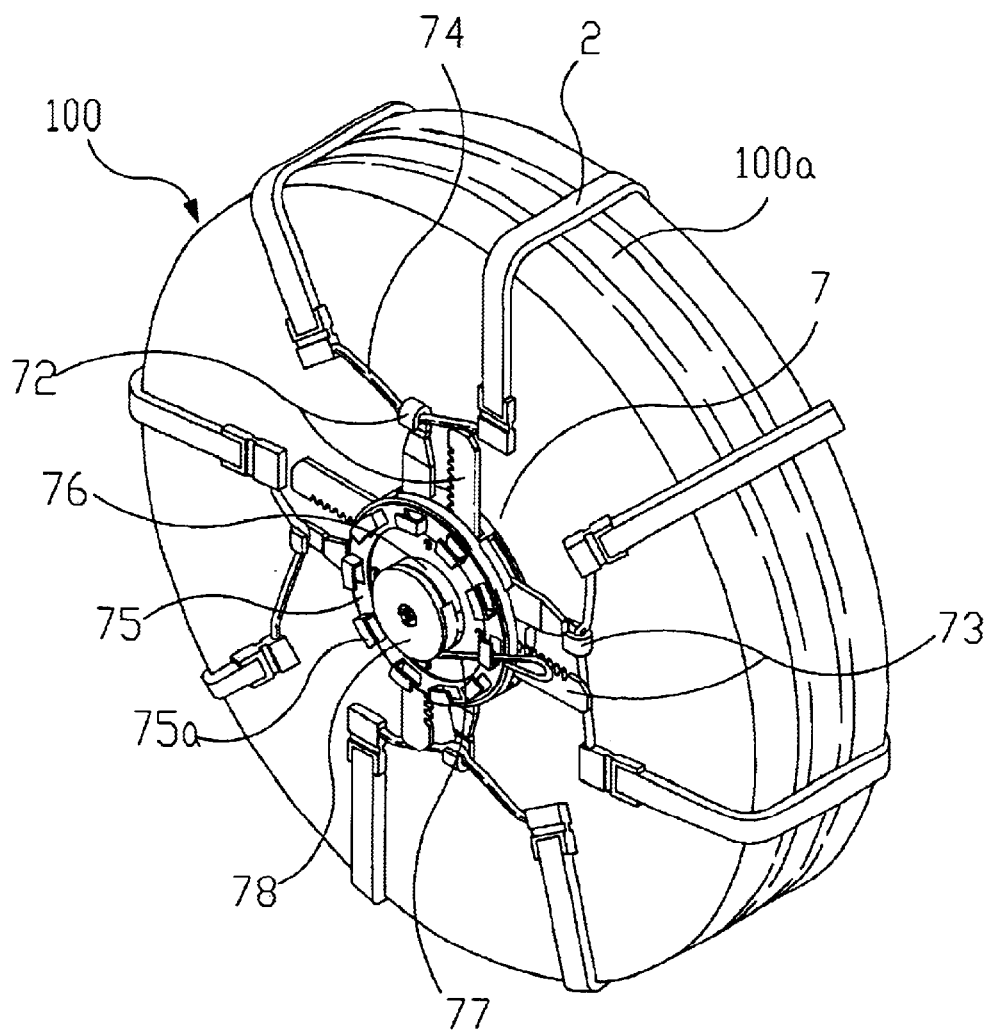
FIG. 14 is a view illustrating the use of a tire slipping prevention apparatus according to a fourth embodiment of the present invention.

FIGS. 12 through 14 are a disassembled perspective view, a front view and a using state view of a tire slipping prevention apparatus according to a fourth embodiment of the present invention.

As shown in FIGS. 12 through 14, the tire slipping prevention apparatus includes a wire (1 of FIG. 3) having both ends connected at an inner side of the tire for thereby forming a circle having a diameter smaller than an outer diameter of the tire, eight friction members 2 fixed to the wire 1 at a certain distance, four pulling bars 74 for binding the friction members 2 by two, and a straight line movement conversion mechanism 7 for pulling the pulling bars 74 in the center direction of the tire 100 using four pulling racks 72.

The wire 1 is formed of a steel wire having a length shorter than the surrounding length of the tire and has a coupling member 10 engaged at both ends of the wire 1 and connected to each other at the inner side of the tire 100 for thereby forming a circle shape having an outer diameter smaller than the outer diameter of the tire 100.

The friction members 2 include a plurality of pads formed of a flexible material such as synthetic resin, urethane, flamed resin or rubber and include a certain length. One end of each of the friction members 2 is fixed to the wire 1 at a certain distance. The friction members 2 are extended from the wire 1 having both ends connected to each other at the inner side of the tire 100 for thereby forming a circle to the outside of the grounding surface 100a of the tire 100. The other end of each of the friction members 2 are extended from the outside of the tire 100 in the center direction of the tire 100. The friction members 2 are closely contacted with the grounding surface 100a of the tire 100 for thereby directly contacting with a surface of the road when a vehicle runs and preventing a slipping of the tires. The lengths and number of the friction members 2 are determined based on the size of the tire 100 and may be formed of a metallic chain.

The pulling bars 74 are formed of a steel bar having a smoothly curved center portion, and two friction members 2 are engaged to both ends of each of the pulling bars 74 for thereby connecting two friction members 2 to the straight line movement conversion mechanism. Therefore, the straight line movement conversion mechanism 7 pulls the friction members 2 by two in the direction of the center of the tire 100. As a result, since the pulling bars 74 connect the friction member 2 to the straight line movement conversion mechanism 7 by two, it is possible to quickly and easily engage the tire slipping prevention apparatus to the tire 100.

The pulling bars 74 are formed of a steel bar having a curved center portion, and two neighbouring friction members 2 are connected with both ends of the pulling bar 74 for thereby pulling two friction members 2 in the center direction of the tire 100.

The straight line movement conversion mechanism 7 converts a rotation force applied to the handle 77 at the outer side of the tire 100 into a tension force in the center direction of the tire and pulls the pulling bars 74 in the center direction of the tire 100 and as shown in FIG. 12 includes a housing 70 for forming two sliding grooves 70b and 70a in vertical and horizontal directions, four pulling racks 72 inserted into the sliding grooves 70b and 70a of the housing 70 in the opposite direction, a pinion gear 71 inserted into the center portion of the housing 70 and engaged with the pulling racks 72, a housing cover 75 for covering the interior of the housing 70, a handle fixing plate 76 rotatably installed integrally with respect to the pinion gear 71 on an outer surface of the housing cover 75, a handle 77 fixed to the handle fixing plate 76 and dynamically connected with the pinion gear 71, and a fixing plate cover 78 for covering the handle fixing plate 76 and shielding a part of the handle 77.

The housing 70 is a circular shape plate having a gear hole formed at the center portion of the same and upper and lower horizontal guide-grooves 70b and left and right vertical guide grooves 70a formed at the upper, lower, left and right portions of the gear hole in a step shape and guides the movements of the pulling racks 72 movably inserted into the guide grooves 70b and 70a in opposite directions. In addition, the gear hole is formed at the center portion of the housing 70, and the pinion gear 71 is inserted through the gear hole and is engaged with the pulling racks 72.

The pulling racks 72 are movably inserted into the sliding grooves 70b and 70a of the housing 70. The pulling racks 72 are inserted into the housing 70 in pair and are movable in the opposite directions by the pinion gear 71. A hook 72a is formed at an end portion of each of the pulling racks 72. The hooks 72a are engaged with the pulling bars 74, and the pulling racks 72 are moved in the center direction by the pinion gear 71 for thereby pulling the pulling bars 74 in the center direction of the tire.

The cover 75 covers the opened portion of the housing 70 for thereby preventing an escape of the pinion gear 71 and the pulling racks 72 in the interior of the housing 70 and is engaged to the housing 70 by bolts. A plurality of cover hooks 75 are formed in a counterclockwise direction along the edge portion of the cover 75 and operate as a reverse rotation prevention member of the straight line movement conversion mechanism 7 for thereby preventing a reverse rotation of the handle 77. The cover hooks 75a prevent a reverse rotation of the handle 77 by an operational force in the counterclockwise direction.

The handle fixing plate 76 is a circular shape inserted onto the rotation shaft 710 in which the pinion gear 71 is fixed. A handle fixing structure 76a is formed at the center of the handle fixing plate 76 for thereby fixing the handle 77. A cut portion 76b is formed at an outer side portion for thereby forming a certain space so that the handle 77 is movable in the upper and lower direction. The handle fixing plate 76 fixes the handle 77 with respect to the rotation shaft 710 in which the pinion gear 71 is fixed and provides a space in which the handle 77 is movable in the rotation direction.

The handle 77 is a rotation bar fixed to the rotation shaft 710 in which the pinion gear is fixed by the handle fixing plate 76 and includes an end hook 77b at the end portion of the same. The handle 77 is rotated by a rotational force applied to the end portion of the same for thereby rotating the pinion gear 71. In a state that the handle is rotated by a certain angle, the end hook 77b of the end portion of the same is engaged by the cover hook 75a of the cover 75 for thereby preventing a reverse rotation, so that the reverse rotation of the pinion gear 71 is prevented. A screw shape elastic variation portion is formed at a fixing end portion of the handle. 77, so that the pinion gear 71 which has a stopped reverse rotation is elastically supported by the pulling rack 72 when the end portion of the handle 77 is engaged with the pulling rack 72. Therefore, the handle 77 is rotated until the pinion gear 71 is not rotated, and the end portion of the handle 77 is rotated more using the elastic variation of the elastic variation portion 77a and is engaged with the more front portion hook 75, so that the pinion gear 71 is elastically supported with respect to the pulling rack 72 by the handle 77. As a result, the elastic variation portion 77a of the handle 77 is elastically fixed in a state that the pinion is rotated in maximum so that the handle 77 is rotated by a rotational force applied to the end portion of the same for thereby rotating the pinion gear 71.

The engaging operation and effects of the tire slipping prevention apparatus according to a fourth embodiment of the present invention are the same as the third embodiment of the present invention. Therefore, the description thereof will be omitted.

As described above, the tire slipping prevention apparatus according to the present invention is directly engaged to the tire in a state that the vehicle is stopped without moving the vehicle. Therefore, the above engagement is easily implemented. The use of the same is convenient. It is possible to quickly attach and detach the tire slipping prevention apparatus to/from the tire of the vehicle.

In addition, the friction members contacting with the ground based on the close contact with the grounding surface of the tire is flat and is fixed in a state that the friction members are closely contacted with the grounding surface of the tire. Therefore, it is possible to prevent a vibration and noise which occur when the vehicle runs.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A tire slipping prevention apparatus, comprising:

a wire having separable coupling means connected at both ends of the wire at an inner side of a tire for thereby forming a circle shape having a diameter smaller than an outer diameter of the tire;

a plurality of friction members each having one end connected to the wire at a regular distance and extended from the wire across a grounding surface of the tire to an outer side of the tire and arranged along the grounding surface of the tire at the regular distance;

a pulling apparatus installed in a center portion of an outer surface of the tire and formed of a handle extended in a radial direction from the center portion, a straight line movement conversion mechanism for converting a moment applied to the handle into a tensile force in a center direction and applying the tensile force to the other end of the friction member, and reverse rotation prevention means for preventing a reverse rotation of the straight line movement conversion mechanism; and a plurality of pulling bars each having a first end and a second end, each of said first end and said second end engaged with a different end of said friction members and a center portion connected with the straight line movement conversion mechanism of the pulling apparatus and separably connecting the friction members with the straight line movement conversion mechanism by two;

wherein the straight line movement conversion mechanism pulls each of said friction members in the direction of the center of the tire using the pulling bars and prevents reverse rotation by the reverse rotation prevention means, so that each friction member is stably fixed to the tire based on a close contact.

2. The apparatus of claim 1, wherein said straight line movement conversion mechanism includes a housing, a sun gear installed at the center of the housing which is rotated based on an inter-work by the handle, a plurality of planet gears arranged on a surrounding portion of the sun gear in the interior of the housing which are rotated based on an engagement with the sun gear and each planet gear having a winding portion at one side of an outer surface, and a plurality of pulling wires which each have an end portion separably connected with the center of each pulling bar outside the housing and which are wound on the winding portion of each planet gear for thereby tensing each friction member in the center of the tire by two using each pulling bar.

3. The apparatus according to claim 1, wherein said reverse rotation prevention means is formed of a plurality of hooks formed along an edge portion of the housing and engaged with the end portions of the handle.

4. The apparatus according to claim 1, wherein said reverse rotation prevention means includes a screw shape structure formed at an inner end portion of the handle so that the handle engaged by a hook prevents rotation of the sun gear.

* * * * *

UNITED STATES PATENT AND TRADEMARK OFFICE
CERTIFICATE OF CORRECTION

PATENT NO. : 6,619,353 B1
DATED : September 16, 2003
INVENTOR(S) : Jong Gil Kim

It is certified that error appears in the above-identified patent and that said Letters Patent is hereby corrected as shown below:

Column 2,
Line 26, "an" should be -- a --

Column 5,
Line 45, "ear" should be -- gear --

Column 10,
Line 15, "housing" should be -- housings --

Signed and Sealed this

Sixth Day of January, 2004

JAMES E. ROGAN
*Director of the United States Patent and Trademark Office*